United States Patent [19]
Sugino

[11] Patent Number: 5,440,406
[45] Date of Patent: Aug. 8, 1995

[54] IMAGE PROCESSING DEVICE FOR REPRODUCING IMAGES IN SPATIAL ORDER

[75] Inventor: Hajime Sugino, Ebina, Japan

[73] Assignee: Fuji Xerox Co., Ltd., Tokyo, Japan

[21] Appl. No.: 227,517

[22] Filed: Apr. 14, 1994

[30] Foreign Application Priority Data

Apr. 16, 1993 [JP] Japan .................. 5-112359

[51] Int. Cl.⁶ ............... H04N 1/04; H04N 1/191; H04N 1/21
[52] U.S. Cl. .................. 358/444; 358/474; 358/482; 358/494
[58] Field of Search ........... 358/482, 483, 494, 444, 358/513, 514, 524, 474, 471, 505; 250/208.1; 348/294

[56] References Cited

U.S. PATENT DOCUMENTS

| | | | |
|---|---|---|---|
| 4,134,135 | 1/1979 | Inokuchi et al. | 358/494 |
| 4,896,216 | 1/1990 | Brunst et al. | 358/482 |
| 5,204,519 | 4/1993 | Nishihara et al. | 250/208.1 |

FOREIGN PATENT DOCUMENTS

2-265362 10/1990 Japan.
3-112264 5/1991 Japan.

*Primary Examiner*—Scott A. Rogers
*Attorney, Agent, or Firm*—Oliff & Berridge

[57] ABSTRACT

An image processing device rearranges image signal output in a different order from a spatial order of photosensitive elements to be in the order of the photosensitive elements. A logical value output of a flip-flop is switched each time a line start signal is input. As a third selector switch is connected to the flip-flop, it is also switched following this behavior, by which region or lower half region of a whole memory region of a RAM for pixel data values is specified each time a pulse is output from a line start signal generator. While the image pixel data values for one line are being written in a half region of the whole memory region of the RAM, the pixel data values for the previous line are read from the other half region of the memory region in accordance with an order predetermined by counted value conversion circuitry.

4 Claims, 10 Drawing Sheets

| VALUE OF THE READ COUNTER | VALUE OF THE READ ADDRESS |
|---|---|
| 0 | 0 |
| 1 | 8 |
| 2 | 16 |
| ⋮ | ⋮ |
| 30 | 240 |
| 31 | 248 |
| 32 | 1 |
| 33 | 9 |
| 34 | 17 |
| ⋮ | ⋮ |
| 62 | 241 |
| 63 | 249 |
| 64 | 2 |
| 65 | 10 |
| ⋮ | ⋮ |
| 94 | 242 |
| 95 | 250 |
| 96 | 3 |
| 97 | 11 |
| ⋮ | ⋮ |
| 126 | 243 |
| 127 | 251 |
| 128 | 4 |
| 129 | 12 |
| ⋮ | ⋮ |
| 158 | 244 |
| 159 | 252 |
| 160 | 5 |
| 161 | 13 |
| ⋮ | ⋮ |
| 190 | 245 |
| 191 | 253 |
| 192 | 6 |
| 193 | 14 |
| ⋮ | ⋮ |
| 222 | 246 |
| 223 | 254 |
| 224 | 7 |
| 225 | 15 |
| ⋮ | ⋮ |
| 253 | 239 |
| 254 | 247 |
| 255 | 255 |

FIG.4

| VALUE OF THE WRITE COUNTER | VALUE OF THE WRITE ADDRESS |
|---|---|
| 0 | 0 |
| 1 | 32 |
| 2 | 64 |
| 3 | 96 |
| 4 | 128 |
| 5 | 160 |
| 6 | 192 |
| 7 | 224 |
| 8 | 1 |
| 9 | 33 |
| 10 | 65 |
| 11 | 97 |
| 12 | 129 |
| 13 | 161 |
| 14 | 193 |
| 15 | 225 |
| 16 | 2 |
| 17 | 34 |
| ... | ... |
| 239 | 253 |
| 240 | 30 |
| 241 | 62 |
| 242 | 94 |
| 243 | 126 |
| 244 | 158 |
| 245 | 190 |
| 246 | 222 |
| 247 | 254 |
| 248 | 31 |
| 249 | 63 |
| 250 | 95 |
| 251 | 127 |
| 252 | 159 |
| 253 | 191 |
| 254 | 223 |
| 255 | 255 |

FIG.7

IMAGE PROCESSING DEVICE FOR REPRODUCING IMAGES IN SPATIAL ORDER

FIELD OF THE INVENTION

The present invention relates to an image processing device, and especially to one which processes image signals read by a line image sensor.

BACKGROUND OF THE INVENTION

Conventionally, for an image processing device of this type, one mainly comprising a photosensitive element array wherein a plurality of photosensitive elements are provided in a line; thin film transistors, the number of which corresponds to that of the photosensitive elements and which are connected in series with the photosensitive elements; and a drive circuit to control these thin film transistors is known as described in Japanese unexamined patent application number Hei 2-265362 (1990). In such an image processing device, the photosensitive elements are divided into blocks of elements, the output of the thin film transistors connected to the photosensitive elements disposed in the same positions in each block are connected together, and the gate electrodes of the thin film transistors connected to the photosensitive elements in each block are also connected together. Reading of image signals is carried out block by block, and moreover, as the thin film transistors connected to the photosensitive elements disposed in the same block are conductive simultaneously, the photosensitive elements in each block output signals simultaneously.

In the above described conventional device, however, as the signal lines connected to the output lines of switching transistors are disposed in a matrix formation and the switching transistors disposed in the same block are conductive simultaneously, signal crosstalk occurs among the intersecting signal lines, which makes it difficult to read image signals precisely. To solve one defect of the above-identified conventional device, an image processing device as shown in FIG. 9 has previously been developed.

As shown in FIG. 9, the image processing device comprises a photosensitive element array 21 wherein a plurality of photosensitive elements 20 are provided; thin film transistors 22 connected to the corresponding photosensitive elements 20 and the number of which is the same as that of the photosensitive elements; a gate driver 23 to control the thin film transistors 22; an analog multiplexer 24 to output in turn the image signals coming from the photosensitive elements 20 through the thin film transistors 22. Here, the photosensitive elements 20 are divided into blocks of elements, and the output of the thin film transistors 22 connected to the photosensitive elements 20 disposed in the same block are connected together and are connected to the input of the analog multiplexer 24. Further, if the photosensitive elements 20 of each block are numbered from the left side as shown in FIG. 9, the gate electrodes of the thin film transistors 22 connected to the corresponding photosensitive elements 20 disposed in the same positions in each block, for example $P_{11}$, $P_{21}$ and $P_{M1}$, are connected together and are connected to the gate driver 23. Therefore, data lines 25, the number of which corresponds to the number of blocks, are connected to the analog multiplexer 24 and gate lines 26, the number of which corresponds to the number of photosensitive elements in a block are connected to the gate driver 23.

In this image processing device, reading of image signals is carried out as follows. A Gate drive pulse signal having a predetermined pulse width is outputted from the gate driver 23 as shown in FIG. 10, by which image signals from the photosensitive elements 20 disposed in the same positions in each block are inputted to the analog multiplexer 24 through the thin film transistors 22 which are conductive. The analog multiplexer 24 outputs in turn, as shown in FIG. 10, the image signals inputted from each block in accordance with the scan clock pulses generated internally, so the image signals are outputted not in sequential order along the scan line, but with the first element of the first block $P_{11}$ followed by the first element of the second block $P_{21}$, then the first element of the third block $P_{31}$, and so on (in FIG. 9, image signals are outputted with an interval N between successive pixels). Therefore, this image processing device is different from the conventional one in this point, that is, the data lines 25 do not cross one another and signal crosstalk does not occur, by which precise image signals can be obtained.

This device, however, has a problem, in that, as the image signals are outputted not in the spatial order of the photosensitive elements, the image signals read from the analog multiplexer must be rearranged in the spatial order of the photosensitive elements when the image signals read are displayed in a display device or printed by a printing device.

SUMMARY OF THE INVENTION

It is an object of the present invention to provide an image processing device free of the defects found in the conventional art.

It is another object of the present invention to provide an image processing device to rearrange image signals read in a different order from the spatial order of the photosensitive elements to be in the spatial order of the photosensitive elements.

Additional objects and advantages of the invention will be set forth in part in the description which follows and in part will be apparent from the description, or may be learned by practice of the invention.

The image processing device according to the present invention comprises memory means for storing successive pixel data values inputted in a different order from the spatial order of the photosensitive elements and address producing means for outputting address data to the memory means, such that pixel data values are read from the memory means in accordance with the predetermined read order. It is preferable that the address producing means outputs address data corresponding to the spatial order of the photosensitive elements in the image sensor which reads an image.

The image processing device according to the present invention also comprises memory means for storing successive pixel data values inputted in a different order from the spatial order of the photosensitive elements and address producing means to output address data to the memory means, while the pixel data values are not being written in the memory means, pixel data values from the memory means in accordance with the predetermined read order. It is preferable that the address producing means outputs address data corresponding to the spatial order of the photosensitive elements which produce the pixel data values.

The image processing device according to the present invention further comprises: memory means for storing pixel data values inputted from outside at predetermined intervals in a different predetermined order from the spatial order of the photosensitive elements; write address producing means for producing write addresses for the pixel data values to the memory means in synchronism with the input timing of the pixel data values; a line start signal generator which produces a pulse each time inputting of the pixel data values from the photosensitive elements of a line is started; memory region specifying means for specifying an upper half region or a lower half region of a whole memory region for pixel data values in the memory means each time the pulse is outputted from the line start signal generator; read address producing means for producing read addresses to be inputted to the memory means in order to read pixel data values from the region not specified by the memory region specifying means for the memory means during one period of the input timing of the pixel data values for the memory means. It is preferable that the read address producing means comprises counting means for counting each time the pixel data values are written to the memory means, and counted value conversion means for converting a counted value of the counting means into address data corresponding to the spatial order of the photosensitive elements.

The image processing device according to the present invention yet further comprises: memory means for storing the pixel data values inputted from outside; write address producing means for outputting write address data values to the memory means such that the memory means stores the pixel data values inputted from outside in a different order from the spatial order of the photosensitive elements outputting pixel data values, rearranging them to be in the order corresponding to the spatial order of the photosensitive elements; and read address producing means for outputting read addresses to read pixel data values from the memory means to the memory means.

The image processing device according to the present invention yet further comprises: memory means for storing the pixel data values inputted from outside; write address producing means for producing write addresses for the pixel data values to the memory means in synchronism with an input timing of the pixel data values; a line start signal generator to produce a pulse each time inputting of the pixel data values from the photosensitive elements of a line is started; memory region specifying means for specifying an upper half region or a lower half region of a whole memory region for pixel data values in the memory means each time the pulse is outputted from the line start signal generator; and read address producing means for producing read addresses to be inputted to the memory means in order to read pixel data values from the region not specified by the memory region specifying means during one period of the input timing of the pixel data values for the memory means. It is preferable that the write address producing means comprises counting means for counting in accordance with the input timing of the pixel data values and counted value conversion means for converting the values obtained by the counting means into read addresses corresponding to the desired order of pixel data values from the memory means.

In one aspect of the image processing device according to the present invention, as the address producing means produces read address in accordance with the predefined read order and inputs them to the memory means, if the write order for pixel data values of the memory means is different from the spatial order of the photosensitive elements which produce the pixel data values, pixel data values are read in accordance with the spatial order of the photosensitive elements by rearranging in advance the order of addresses produced by the address producing means to be the spatial order of the photosensitive elements.

In another aspect of the image processing device according to the present invention, as the a pixel data value is read from the memory means during the time between one writing and the next writing of the pixel data values, the processing time is saved, compared to a device which reads pixel data values after a specified amount of pixel data values are written.

In another aspect of the image processing device according to the present invention, while the pixel data values for one line are being written in the half region of the memory means, the pixel data values for the previous line are read from the other half region of the memory means.

In another aspect of the image processing device according to the present invention, in addition to this behavior, address data produced by converting the value obtained by the counting means is inputted to the memory means, and as a result, pixel data values are read in the spatial order of the photosensitive elements.

In another aspect of the image processing device according to the present invention, write addresses produced by the write address producing means are inputted to the memory means and the pixel data values are written in accordance with the addresses, by which the write order is rearranged to be the spatial order of the photosensitive elements.

In another aspect of the image processing device according to the present invention, while the pixel data values for one line are being written in the half region of the memory means, the pixel data values for the previous line are read from the other half region of the memory means.

In another aspect of the image processing device according to the present invention, in addition to this behavior, pixel data values are written in accordance with the write address data values produced by the counting means and counted value conversion means and inputted to the memory means, and as a result, pixel data values are written in the spatial order of the photosensitive elements.

BRIEF DESCRIPTION OF THE DRAWING

FIG. 4 shows the comparison between the value of the read counter and that of the read address.

FIG. 7 shows the comparison between the value of the write counter and that of the write address.

DETAILED DESCRIPTION OF THE INVENTION

EMBODIMENT 1

Figure 1:
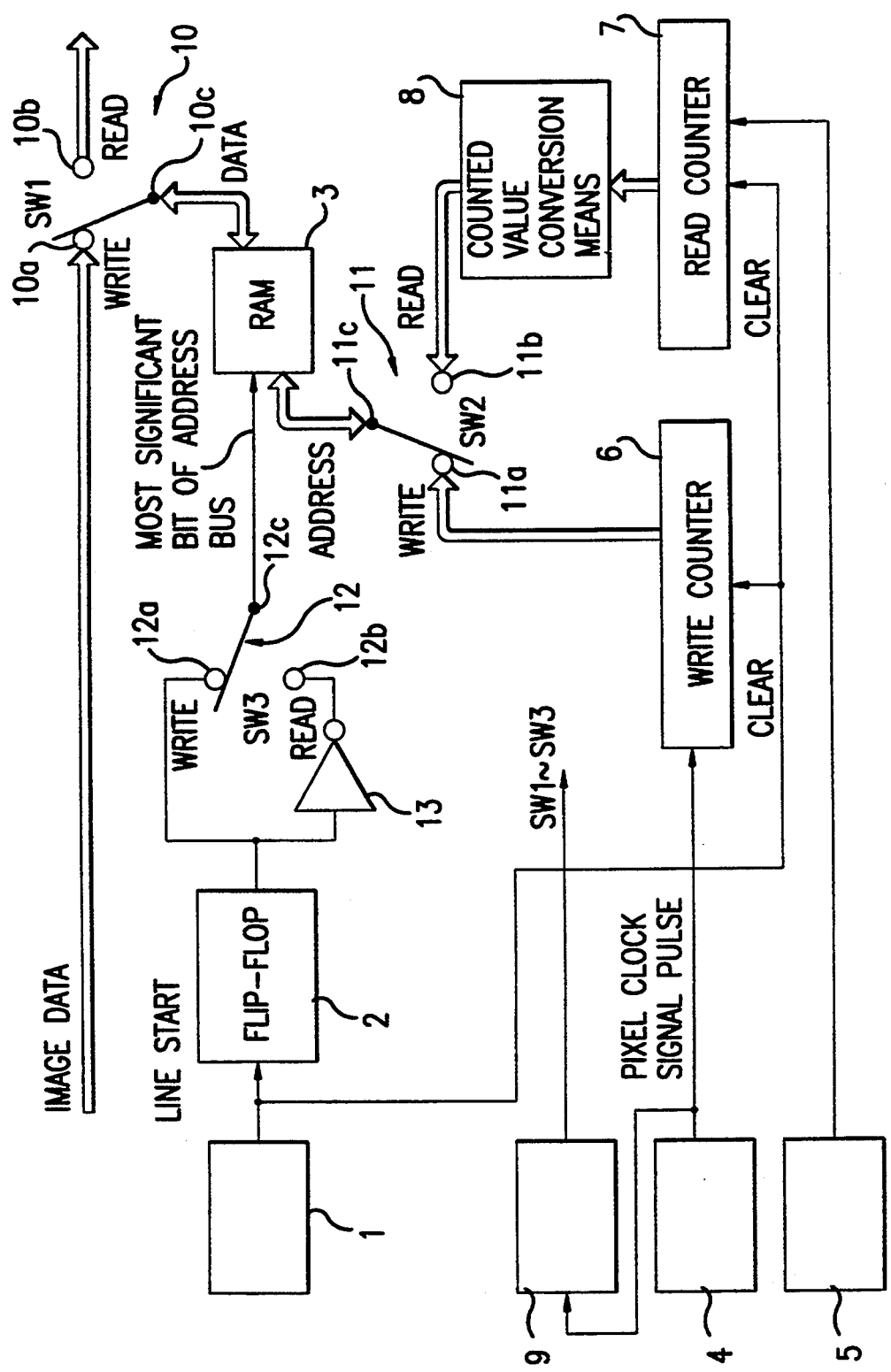
FIG. 1 shows the structure of a first embodiment of the image processing device according to the present invention.
Figure 2:
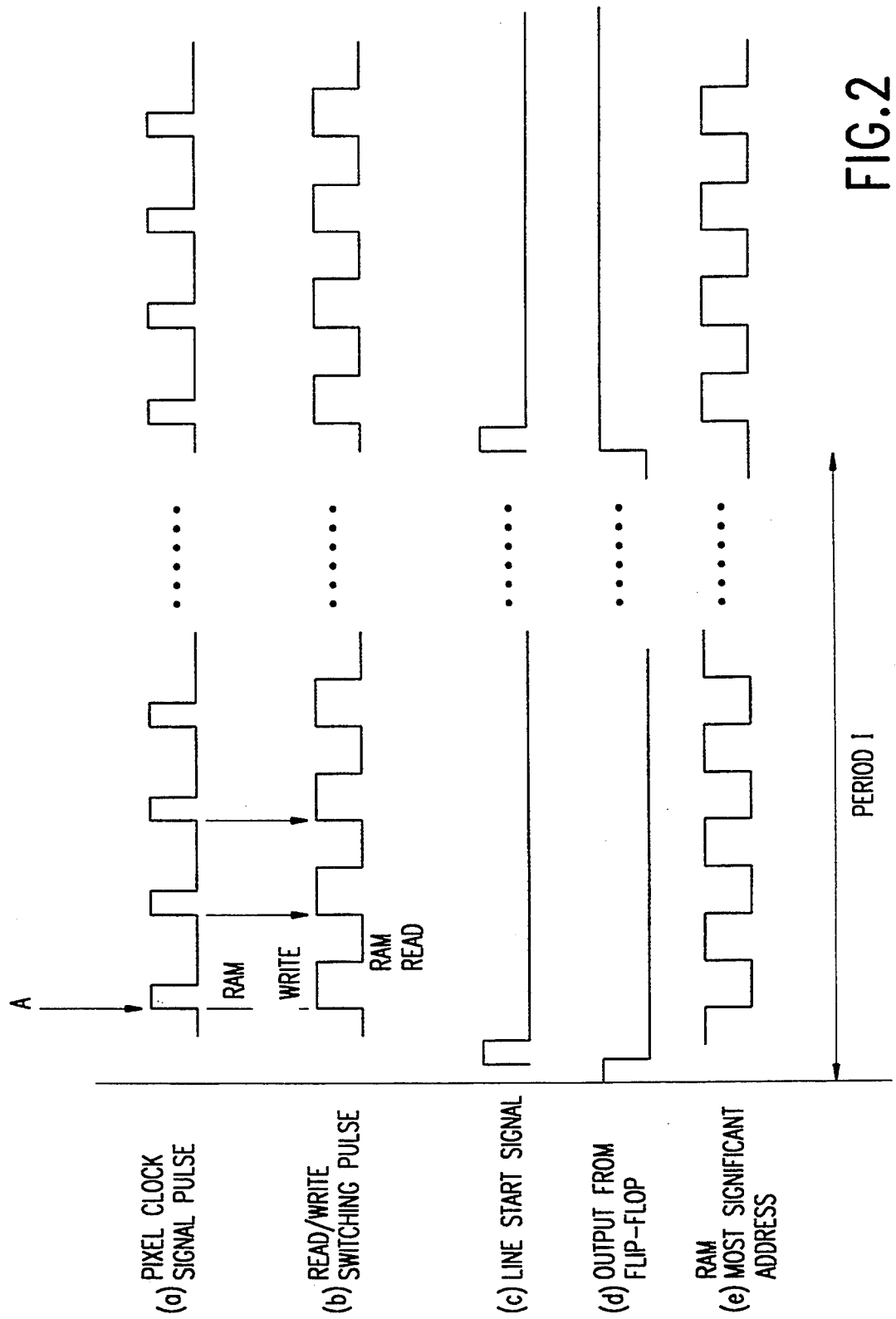
FIG. 2 (FIG. 2a–FIG. 2e) is a timing chart for the signals in principal portions of the device, and it shows the behavior of the image processing device of the embodiment shown in FIG. 1.
Figure 3:
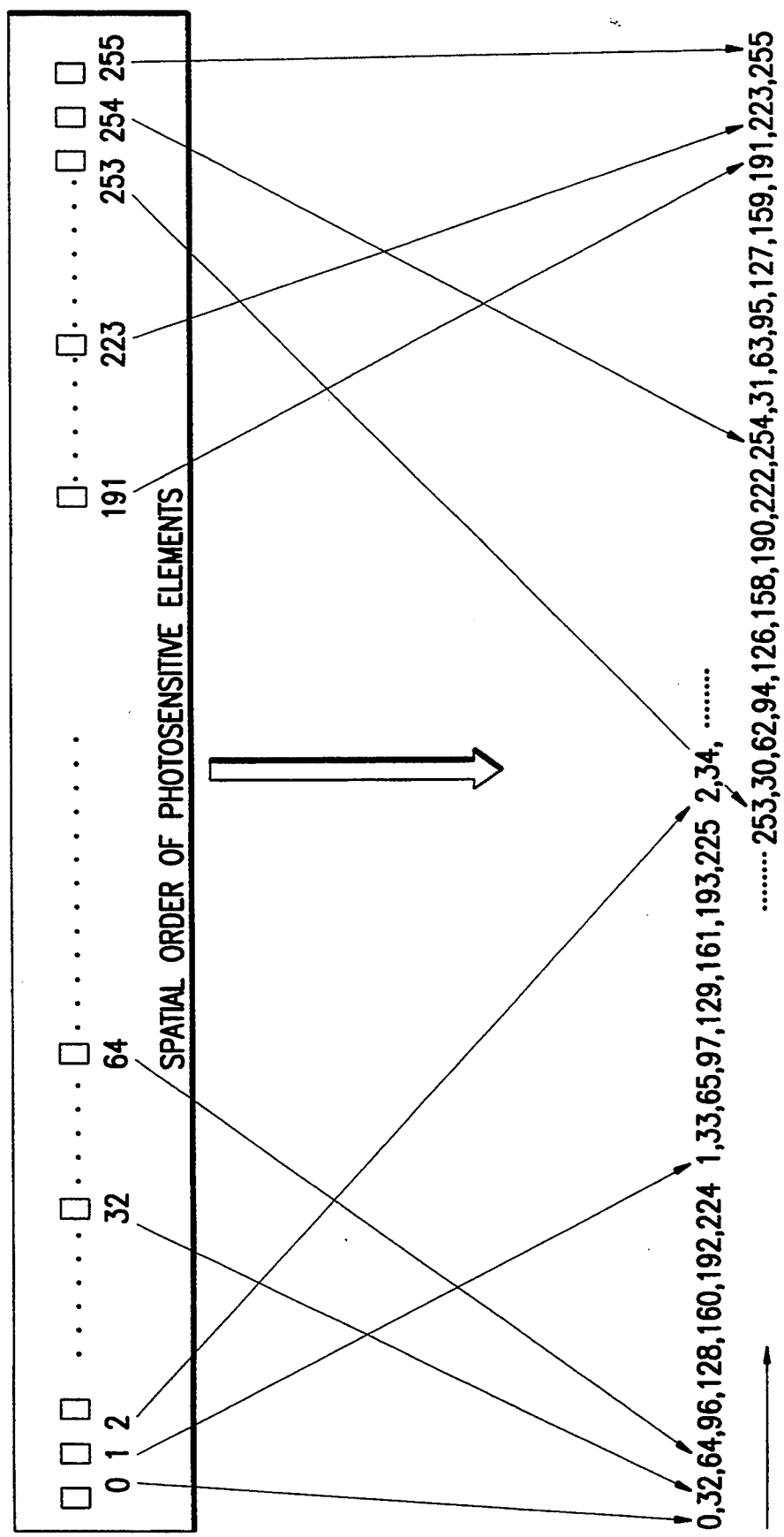
FIG. 3 shows the input order of the pixel data values inputted to the image processing device according to the present invention.

The image processing device according to the present invention is now described, referring to FIGS. 1 to 5 inclusive. FIG. 1 shows the structure of a first embodiment of the image processing device according to the present invention, FIG. 2 is a timing chart for signals in principal portions of the device and it shows the behavior of the image processing device of the embodiment shown in FIG. 1, FIG. 3 shows the input order for the pixel data values inputted to the image processing device according to the present invention, FIG. 4 shows the comparison between the value of the read counter and that of the read address of the embodiment shown in FIG. 1, and FIGS. 5(a) and (b) show the behavior of RAM used in the embodiment shown in FIG. 1.

The image processing device according to the present invention mainly comprises a line signal generator 1, a flip-flop 2, a RAM 3, a pixel clock signal generator 4, a read clock signal generator 5, a write counter 6, a read counter 7, counted value conversion means 8 and a pulse converter 9.

For the image sensor to read the image signals inputted to this device, a line image sensor which is not shown in the figure is used. It scans electrically in the direction along the axis of the line, that is, in the fast scan direction, and it is moved in the slow scan direction by a carriage which is not shown in the figure. The line signal generator 1 outputs a line start signal which is a read starting signal for the signals from the line image sensor. In the device according to the present invention, reading of an image is carried out by moving in the slow scan direction the line image sensor wherein the photosensitive elements are provided in a line as shown fin FIG. 3, and the line start signal is produced when the pixel data values are read from the line image sensor. The output of the line signal generator 1 are connected to the flip-flop 2, write counter 6 and read counter 7.

The flip-flop 2 inverts its output, using an output pulse from the line signal generator 1 as a trigger, and the output of the flip-flop 2 is connected to one terminal 12a of a third selector switch 12 (write side) and the other terminal 12b (read side) through an inversion circuit 13. The switching terminal 12c of the third selector switch 12 is connected to the most significant bit of the address bus of the RAM 3.

The pixel clock signal generator 4 produces pixel clock signal pulse which is synchronized with the input timing of the pixels from the image signal inputted from outside, and the write counter 6 counts each time a pixel clock signal pulse is input.

The read clock signal generator 5 produces read signals necessary for the counting performed by the read counter 7, and the read counter 7 increments the counted value each time a read clock signal is outputted from the read clock signal generator 5. RAM 3 is an IC read-write memory, and in the present invention, address data for writing and reading comprises one bit being inputted through the third selector switch 12 and the rest of the bits inputted through the second selector switch 11. If the data for one pixel value is 8 bits and the number of pixels included in the line image sensor is 256, the RAM 3 needs a memory capacity of at least twice this to hold the 256 pixel values, that is, $2 \times 256 = 512$ values. Therefore, the address data for RAM 3 comprises 9 bits and the data inputted to RAM 3 from the write counter 6 through the selector switch 11 or the counted value conversion means 8 comprises 8 bits. A switching contact 10c of the first selector switch 10 is connected to RAM 3, and when the switching contact 10c is switched to the contact 10a, that is the write side, RAM 3 is switched to the write state for the pixel data values inputted from outside, and when the switching contact 10c is switched to the other contact 10b, that is the read side, the RAM 3 is switched to the read state for the pixel data values.

For each of the first, second and third switches, 10, 11 and 12, for example, an electric switch generally known as a gate IC or a data selector may be used.

The write counter 6 counts each time a pixel clock signal pulse is inputted. In the present embodiment, the counted value is 8 bits as described above, and this value is inputted to the address line of RAM 3 as address data for RAM 3.

The read counter 7 basically has the same functions as the write counter 6, and it increments the counted value each time a read clock signal pulse is inputted from the read clock signal generator 5. The counted value of this read counter 7 is 8 bits, and this value is inputted to the counted value conversion means 8, which converts the counted values of the read counter 7 into address data necessary for reading the image signals from RAM 3. The detailed description of this system is stated later. The pulse converter 9 produces read/write switching pulses which control the first to third inclusive selector switches, 10 to 12, in accordance with the pixel clock signal pulse.

The behavior of this device with the above described structure is now described, referring to FIG. 2. Prior to inputting of pixel data values from the line image sensor which is not shown in the figure, a line start signal is produced from the line signal generator 1 as shown in FIG. 2(c), and the line start signal is inputted to the flip-flop 2, write counter 6 and read counter 7. The inputted of a line start signal inverts the output of the flip-flop 2 with respect to the state before the line start signal is inputted. For example, referring to the example shown in FIG. 2(d), the logical value of the output from the flip-flop 2 is made to be 0 by the first line start signal and then it is made to be 1 by the next line start signal. Further, the counted values of the write counter 6 and the read counter 7 are reset to 0 by the inputting of line start signals.

Pixel clock signal pulses are outputted from the pixel clock signal generator 4 at predetermined intervals, and they are inputted to each of the write counter 6 and the pulse converter 9. Counting by the write counter 6 is started by inputting of a pixel clock signal pulse, and it increments the counted value each time a pixel clock signal pulse is inputted. Further, pixel clock signal pulses are input to the pulse converter 9, and the pulse converter 9 produces read/write switching pulses having a duty cycle of 50 percent and whose leading edge arrives in synchronism with the pixel clock signal pulse.

The read/write switching pulse signal is used for switching RAM 3 between the read state and the write state, and the first to third inclusive selector switches 10 to 12 behave in synchronism with the read/write switching pulse signal. In the present embodiment, if the logical value of the read/write switching pulse signal is 1, the switching contacts 10c, 11c and 12c of the first to third inclusive selector switches 10 to 12 respectively are connected to 10a, 11a and 12a, that is, the write side, respectively, and the RAM 3 is in the write state. On the other hand, if the logical value is 0, the switching contacts 10c, 11c and 12c of the first to third inclusive selector switches 10 to 12 respectively are connected to 10b, 11b and 12b, that is, the read side, respectively, and the RAM 3 is in the read state.

If the flip-flop 2 outputs a logical value of 0, the logical value of the read/write switching pulse signal is 1 and the first to third inclusive selector switches 10 to 12 are switched to the write side, the logical value of the most significant bit of the address bus of RAM 3 is 0, by which the lower half of the whole address region of RAM 3 is predetermined. For example, if the number of the address bits is 9, addresses up to 255 are predetermined in turn in accordance with the counted value of the write counter 6. In FIG. 2, if the counted values of the write counter 6 and the read counter 7 are 0 at the furthest left point A of the pixel clock signal pulse, the pixel data value inputted at this timing is written in the lowest address in the lower address region of RAM 3, that is, if the total number of the address bits of RAM 3 is 9, the first pixel data value is stored at address 0, and the pixel data values are written at successive addresses of the lower address region of RAM 3 each time the logical value of the read/write switching pulse signal becomes 1. Here, as described above, the pixel data values inputted from outside are outputted with a predetermined interval between successive pixel data values with respect to the spatial order of the photosensitive elements in the line image sensor, so if the line image sensor comprises 256 photosensitive elements as shown in FIG. 3, the pixel data values are inputted with an interval corresponding to 32 photosensitive elements between successive pixel data values as shown in the lower portion of FIG. 3, and they are stored in order from the bottom address of the lower address region of RAM 3.

On the other hand, if the logical value of the read/write switching pulse signal becomes 0 and the first to third inclusive selector switches 10 to 12 are switched to the read side, RAM 3 is in the read state for data. Meanwhile, as the output value of the flip-flop 2 is inputted through the inversion circuit 13, while the flip-flop 2 is being outputting a logical value of 0, the logical value of the most significant bit of the address bus of RAM 3 becomes 1. Therefore, the upper half region of the whole address space of RAM 3 is predetermined, and pixel data values are read from the upper address region one by one each time the read/write switching pulse signal becomes 0. Here, with RAM 3 in the read state, the address data inputted to RAM 3 is not the counted value of the read counter 7 itself but the value obtained by converting the counted value of the read counter 7 by the counted value conversion means 8, since the order of the pixel data values written in RAM 3 is different from the spatial order of the photosensitive elements in the line image sensor as described above. Further, the pixel data values read from RAM 3 during the period I, which begins from when a line start signal is produced and lasts until the next signal is produced and is called a line scan from now, are the data values written in RAM 3 during a period immediately before the period I mentioned here and which is not shown in the figure, and the pixel data values written in RAM 3 in the period I is read during the next line scan. As shown in FIG. 2(d), the logical value of the output from the flip-flop 2 becomes 1 in the next line scan, the logical value of 0 is predetermined for the most significant bit of the address bus with RAM 3 in the read state, and the pixel data values written in the lower address region during the period I is read from RAM 3.

With RAM 3 in the read state, the counted values of the read counter 7 and the read addresses outputted from the counted value conversion means 8 are now compared referring to FIG. 4 with respect to the next line scan where the pixel data values written during the period I are read. As shown in FIG. 4, the read addresses are outputted from the counted value conversion means 8 with an interval 8 between successive addresses while the read counter 7 increments the counted value, since the pixel data values are outputted with an interval corresponding to 8 photosensitive elements between successive pixel data values.

Figure 5A:
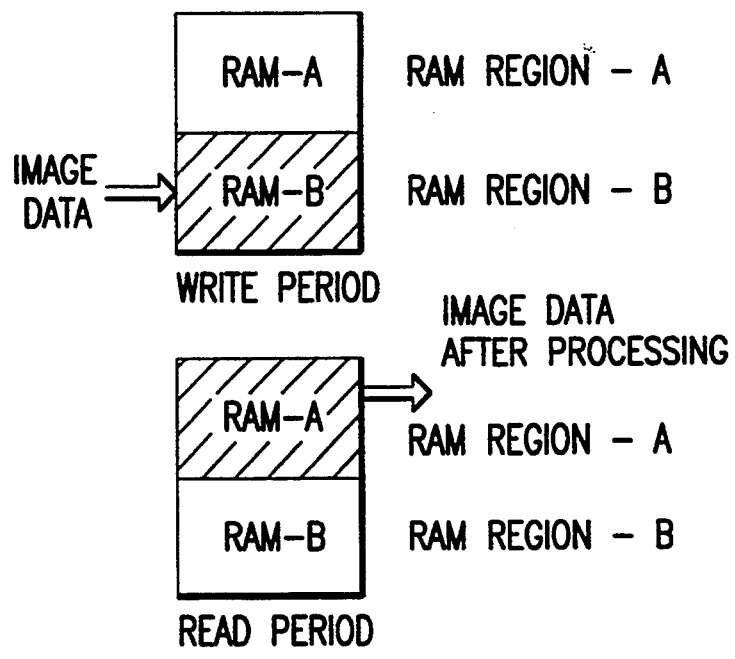
FIG. 5(a) shows the behavior of RAM used in the first embodiment shown in FIG. 1.

The simultaneous use of the two divided memory regions of RAM 3 for write state and read state is now described roughly, referring to FIGS. 2 and 5. In the period I, as shown in FIG. 5(a), during the write period when the logical value of the read/write switching pulse signal is 1, successive pixel data values are written in the lower address region of RAM 3 which is indicated as RAM region-B in FIG. 5, while pixel data values are read from the upper address region which is indicated as RAM region-A in FIG. 5 during the read period when the logical value of the read/write switching pulse signal is 0.

Figure 5B:
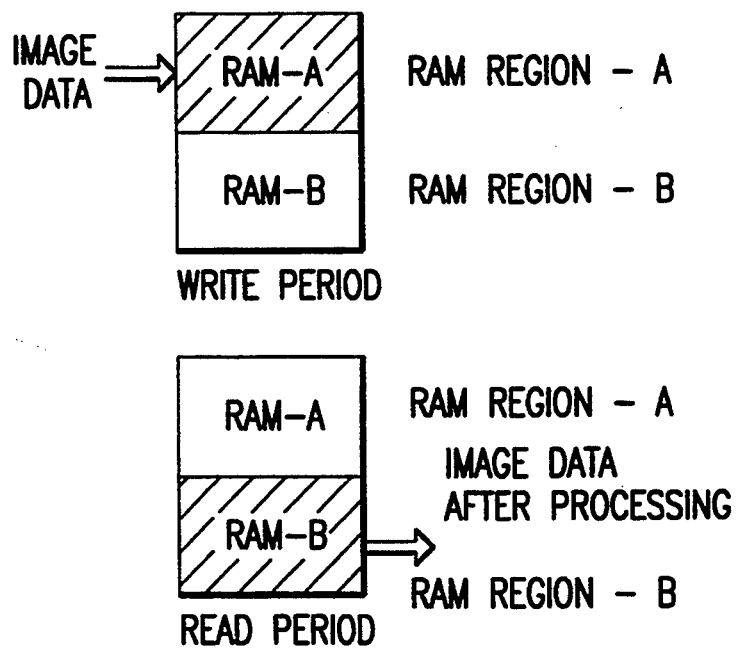
FIG. 5(b) shows the behavior of RAM used in the first embodiment shown in FIG. 1.

To the contrary, in the next line scan which is shown in FIG. 5(b), during the write period when the logical value of the read/write switching pulse signal is 1, pixel data values are written in the upper address region of RAM 3 which is indicated as RAM region-A, while pixel data values are read from the lower address region of RAM 3 which is indicated as RAM region-B during the read period when the logical value of the read/write switching pulse signal is 0, and the above described behavior is repeated each time a line start signal is produced. Thus, pixel data values are read from RAM 3 in the spatial order of the photosensitive elements.

EMBODIMENT 2

Figure 6:
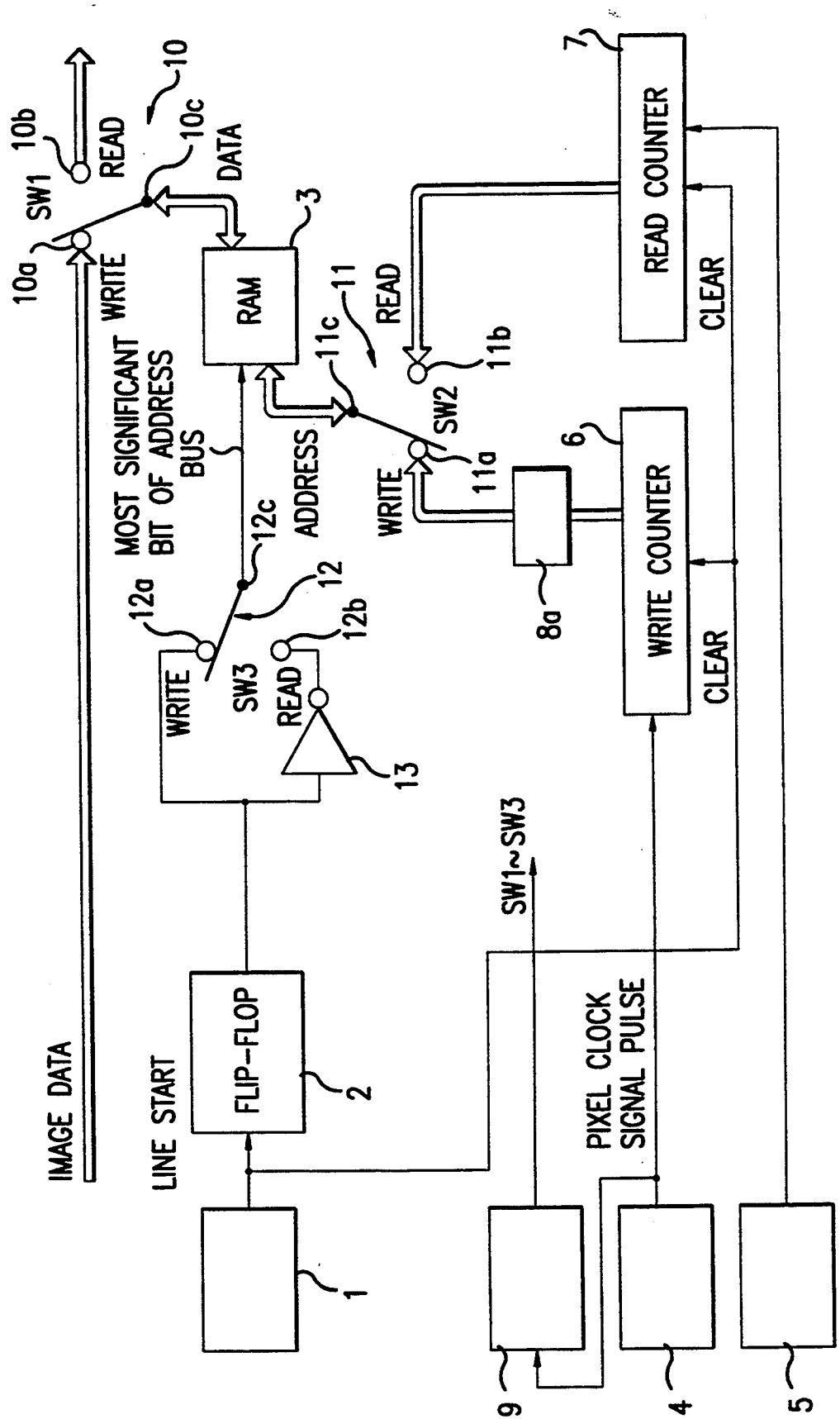
FIG. 6 shows the structure of a second embodiment of the image processing device according to the present embodiment.

FIG. 6 shows a second embodiment of the present invention, and the structure and behavior thereof are now described referring to the figure, centering on the points different from those in FIG. 1. Here, portions which are the same as in FIG. 1 are identified by the same reference numerals and the description thereof are omitted.

In the embodiment shown in FIG. 6, when writing pixel data values in RAM 3, they are written in the spatial order of the photosensitive elements. The output line of the write counter 6 is connected to the counted value conversion means 8a, and the pixel data values are written in the spatial order of the photosensitive elements by inputting the data values obtained by converting the counted values of the write counter 6 by the counted value conversion means 8a.

FIG. 7 shows the counted values of the write counter 6 and the corresponding write addresses inputted to RAM 3 from the counted value conversion means 8a, and the predefined conditions such as the number of photosensitive elements in a line image sensor is the same as in the first embodiment shown in FIG. 1.

As described above, pixel data values are inputted in turn from the photosensitive element disposed at one end of the line image sensor with an interval corresponding to 32 photosensitive elements between successive pixel data values, and the write addresses are set so that successive addresses have an interval of 32 corresponding to the above described interval as shown in FIG. 7. As the basic behavior of this device is the same as that in the first embodiment shown in FIG. 1, the description thereof is omitted.

EMBODIMENT 3

Figure 8:
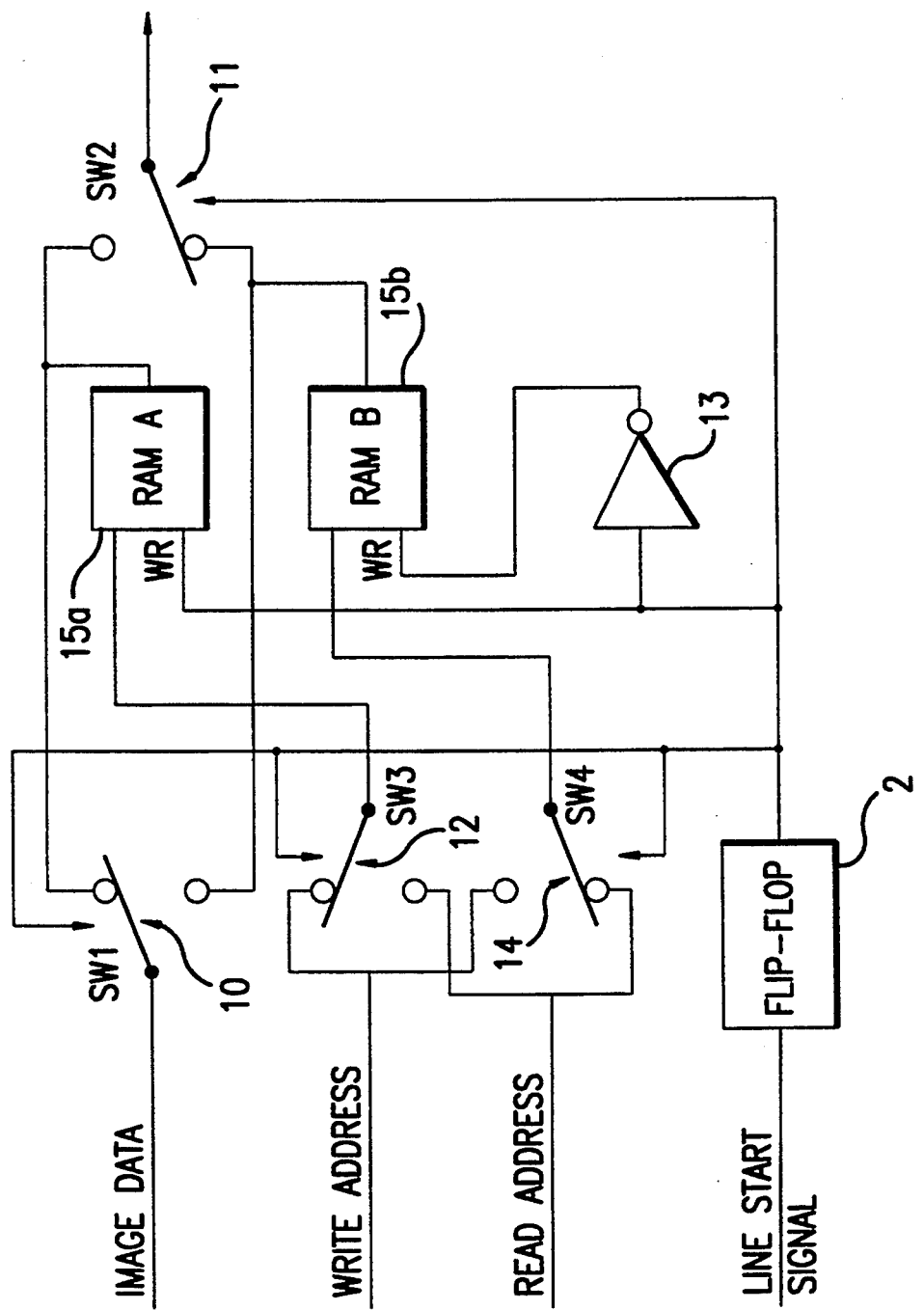
FIG. 8 shows the structure of a third embodiment of the image processing device according to the present embodiment.
Figure 9:
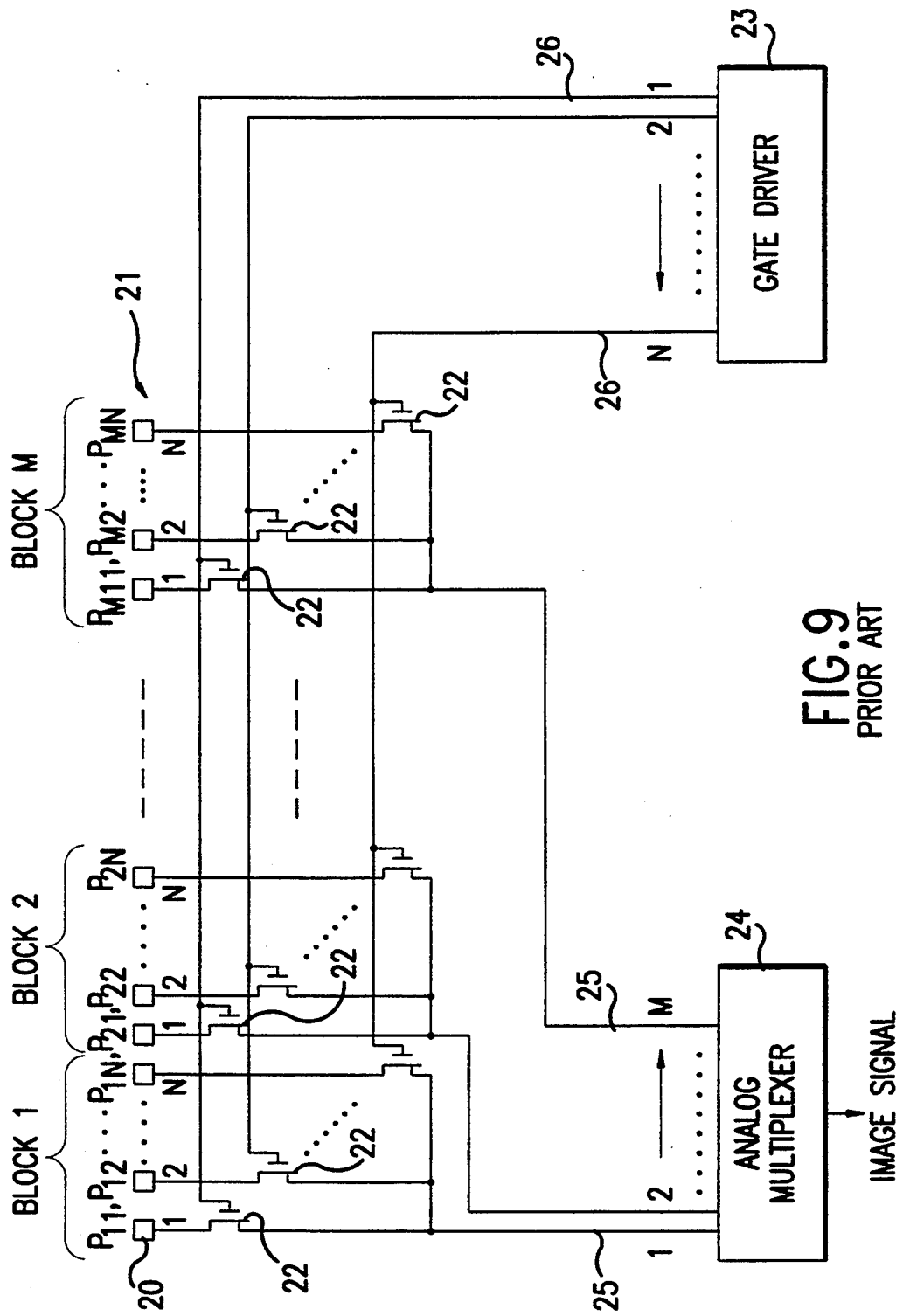
FIG. 9 shows the structure of an example of the image processing device to input pixel data values to the device of the present invention.
Figure 10:
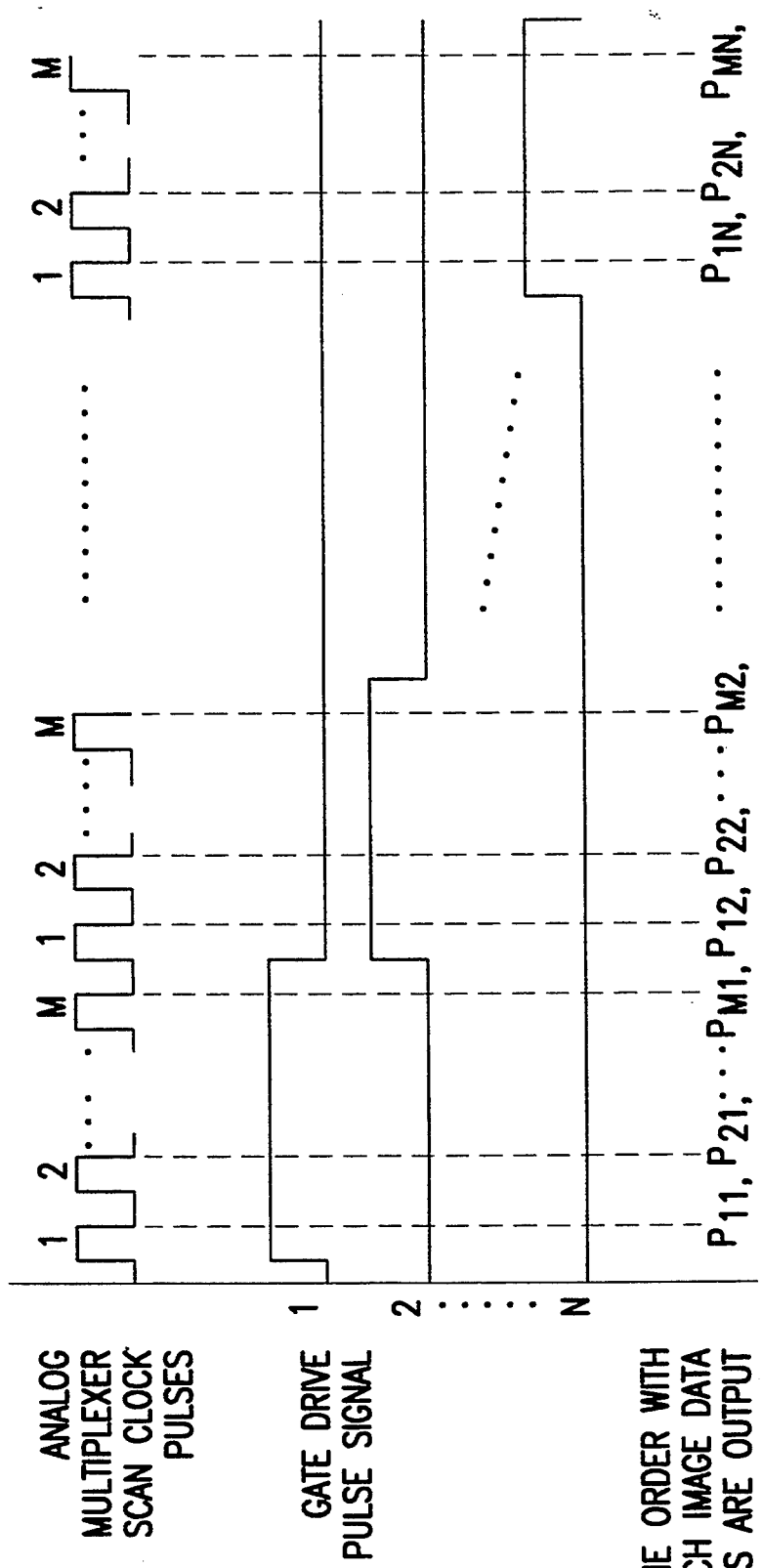
FIG. 10 is a timing chart for the signals in principal portions of the device, and it shows the behavior of the image processing device shown in FIG. 9.

FIG. 8 shows a third embodiment of the present invention, and the embodiment is described referring to the figure and centering on the points different from those in FIG. 1. Portions which are the same as shown in FIG. 1 are identified by the same reference numerals and the description thereof are omitted.

In the first embodiment shown in FIG. 1, the memory region of RAM 3 is divided into an upper address region and a lower address region by inverting the most significant bit of the address bus of RAM 3 for every line scan, and with this system, if one of them is in the write state, the other is in the read state, and each behavior is inverted for every line scan. In this third embodiment, each of the above described upper address region and lower address region is an independent RAM in respect of hardware.

In FIG. 8, each of RAM A 15a and RAM B 15b has half of the memory capacity of RAM 3 shown in FIG. 1, and the data line is made to be an input line for pixel data values by the first selector switch 10 and it is also made to be an output line by the second selector switch 12. Further, the output from the flip-flop 2 is directly input to the write/read switching terminal of RAM A 15a and it is also inputted to the write/read switching terminal of RAM B 15b through the inversion circuit 13, and thus the write state and the read state for the RAM A 15a and RAM B 15b are switched by turns.

The address lines for RAM A 15a and RAM B 15b are connected to the third selector switch 12 and the fourth selector switch 14 respectively, and the input switching for the write address data and read address data is carried out by the two selector switches 12 and 14. The use of an electrical switch which behaves electrically for the fourth selector switch 14 is the same as the above described embodiments.

With the above described structure, if a line start signal is inputted and the flip-flop 2 outputs a logical value of 1, RAM A 15a and RAM B 15b are in the write state and the read state respectively, and the output from flip-flop 2 makes the first selector switch 10 input pixel data values to RAM A 15a as shown in FIG. 8, the second selector switch 11 output the read data of RAM B 15b as shown in FIG. 8, the third selector switch 12 input write addresses to RAM A 15a as shown in FIG. 8 and again the fourth selector switch 14 input read address data to RAM B 15b.

While successive pixel data values are written in RAM A 15a, the pixel data values stored at the address predetermined by the read address and read from RAM B 15b, so even if the pixel data values are not in the spatial order of the photosensitive elements in the line image sensor, if the read data values are set to be in the spatial order of the photosensitive elements by the read address, basically the pixel data values are read in the spatial order of the Photosensitive elements in the same way as the first embodiment described referring to FIG. 1. The input of the next line start signal makes RAM A 15a and RAM B 15b be in the read state and the write state respectively, and the above described behaviors are carried out.

What is claimed is:

1. An image processing device comprising:
   memory for storing pixel data values inputted from outside at predetermined intervals and in a predetermined order different from a spatial order of photosensitive elements in a line image sensor;
   write address producing means for producing write addresses for the pixel data values to said memory means in synchronism with an input timing of the pixel data values;
   a line start signal generator which produces a pulse each time inputting of the pixel data values from the photosensitive elements in a line is started;
   memory region specifying means for specifying an upper half region or a lower half region of a whole memory region for pixel data values in said memory means each time the pulse is outputted from said line start signal generator; and
   read address producing means for producing read addresses to be inputted to said memory means in order to read a pixel data values from a region not determined by said memory region specifying means for said memory means during one period of the input timing of the pixel data values for said memory means.

2. The image processing device according to claim 1, wherein said read address producing means comprises:
   counting means for counting each time pixel data values are written to said memory means; and
   counted value conversion means for converting a counted value of said counting means into address data corresponding to the spatial order of said photosensitive elements which output pixel data values stored in said memory means.

3. An image processing device comprising:
   memory means for storing pixel data values inputted from outside;
   write address producing means for producing write addresses for pixel data values to said memory means in synchronism with an input timing of the pixel data values;
   a line start signal generator which produces a pulse each time inputting of pixel data values from photosensitive elements in a line is started;
   memory region specifying means for specifying an upper half region or a lower half region of a whole memory region of said memory means for the pixel data values each time the pulse is outputted from said line start signal generator; and
   read address producing means for producing a read addresses to be inputted to said memory means in order to read pixel data values from a region of said memory means not specified by said memory region specifying means during one period of the input timing of the pixel data values for said memory means.

4. The image processing device according to claim 3, wherein said write address producing means comprises:
    counting means for counting in synchronism with the input timing of the pixel data values; and
    counted value conversion means for converting counted values of said counting means into read addresses corresponding to a desired read order of pixel data values read from said memory means.

* * * * *